United States Patent [19]

Cachera

[11] 4,076,585
[45] Feb. 28, 1978

[54] METHOD OF CONTINUOUS TESTING FOR LEAK-TIGHTNESS AND MECHANICAL RESISTANCE OF A REACTOR VESSEL JACKET AND A REACTOR IN WHICH SAID METHOD IS EMPLOYED

[75] Inventor: Pierre Charles Cachera, Saint German en Laye, France

[73] Assignee: Electricite de France (Service National), Paris, France

[21] Appl. No.: 693,879

[22] Filed: Jun. 8, 1976

Related U.S. Application Data

[63] Continuation of Ser. No. 500,558, Aug. 26, 1974, abandoned.

[30] Foreign Application Priority Data

Sep. 7, 1973 France .............................. 73 32374

[51] Int. Cl.² .................................................. G21C 9/00
[52] U.S. Cl. ........................................ 176/38; 176/40; 176/65
[58] Field of Search ................. 176/37, 38, 196 D, 65, 176/87, DIG. 2

[56] References Cited

U.S. PATENT DOCUMENTS

| 3,115,450 | 12/1963 | Schanz ................................. 176/37 |
| 3,288,998 | 11/1966 | Press, Jr. .............................. 176/38 |
| 3,769,161 | 10/1973 | Costes ................................. 176/87 |
| 3,888,730 | 6/1975 | Jackson ............................... 176/38 |

FOREIGN PATENT DOCUMENTS

1,589,148  4/1970  France .................................. 176/37

*Primary Examiner*—Samuel W. Engle
*Assistant Examiner*—Ralph Palo
*Attorney, Agent, or Firm*—Cameron, Kerkam, Sutton, Stowell & Stowell

[57] ABSTRACT

The space formed between the primary vessel of a sodium-cooled fast reactor and a leak jacket surrounding the vessel is filled with an inert gas which is maintained at a pressure in the vicinity of atmospheric. A vacuum is created within the space formed between the leak jacket and the concrete reactor vault and means are provided for detecting the presence of inert gas within the evacuated space and thus continuously testing the jacket for leak-tightness and mechanical resistance.

4 Claims, 1 Drawing Figure

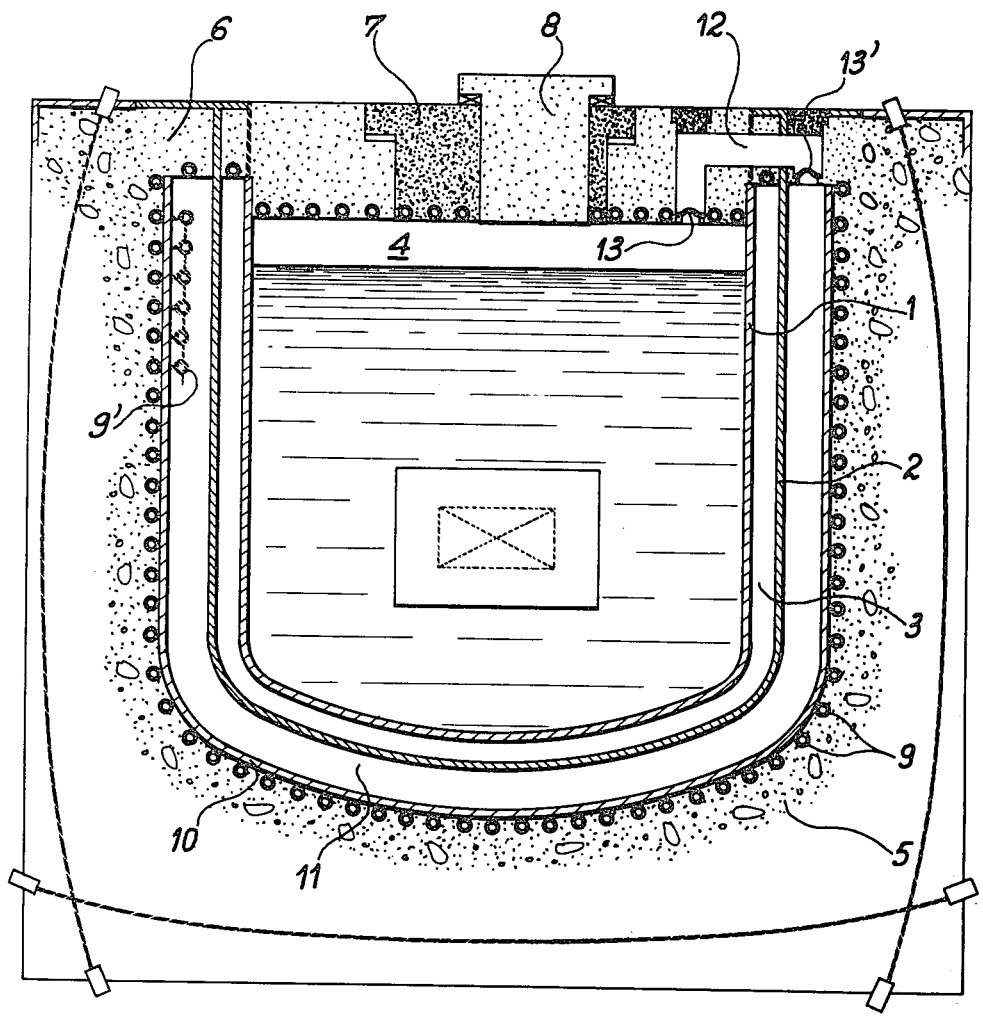

METHOD OF CONTINUOUS TESTING FOR LEAK-TIGHTNESS AND MECHANICAL RESISTANCE OF A REACTOR VESSEL JACKET AND A REACTOR IN WHICH SAID METHOD IS EMPLOYED

This is a Continuation, of application Ser. No. 500,558, filed Aug. 26, 1974, now abandoned.

This invention relates to a method for continuous testing of tightness and mechanical resistance of the leak-jacket of a sodium-cooled fast reactor and to a reactor in which said method is employed.

A better understanding of the problem to be solved will be gained by referring to the single accompanying FIGURE which is a diagrammatic cross-section on a vertical plane showing a sodium-cooled fast reactor. When employed in a nuclear reactor as heat-transporting fluid, sodium has the advantage of not being under pressure. There is therefore no potential danger of incurring loss of coolant in the event of a pressure drop and it is much easier to guard against a loss of sodium level within the reactor. The conventional technique consists in placing all the necessary penetrations within the reactor vessel above the free level of sodium. In a reactor of this type, the enclosure which contains the sodium or so-called primary vessel 1 can accordingly be of simple design without any weak point. As a precautionary measure, the primary vessel is provided with a double-walled structure by placing said primary vessel inside a slightly larger vessel or leak-jacket 2. The space 3 formed between the primary vessel 1 and the leak-jacket 2 is usually filled with neutral gaz at a pressure which is close to atmospheric pressure and this also applies to the "sky" 4 of the main vessel, that is to say the top portion of the main vessel which is not filled with sodium. These two vessels are placed within a safety containment structure constituted by a concrete reactor vault 5 closed by a top shield slab or vault roof 6 in which provision may be made for rotating shield plugs such as the plugs 7 and 8. As shown in a very general manner, the containment structure is equipped with a cooling circuit 9 for maintaining the concrete portions at a moderate temperature. Said cooling circuit, with some redundancy as a precautionary measure, can be placed either in front (9') or behind a heat-insulating lining and can contribute to the removal of residual heat as final emergency circuit in the event of failure of the different heat-removal means.

As shown in the FIGURE, the concrete vault 5 can be covered with a sodium-tight lining membrane 10 usually called liner. Said liner 10 can directely perform the function of the leak-jacket 2 and in that case is sometimes dispensed with. In other cases, the leak-jacket 2 and a sodium-tight containment structure constituted by the concrete vault 5 and the liner 10 are both retained, thus providing a triple barrier against loss of coolant. The choice of design is made according to the possibilities of inspection and maintenance.

A safety philosophy lays down the principle that the number of independent barriers is valid only insofar as said barriers can be tested continuously or at least at regular intervals during reactor operation. In accordance with the current technique, the primary vessel 1 is tested by means of a sodium leak detector placed at the bottom portion of the space 3. However, it is not possible to ascertain the degree of tightness wich the leak-jacket 2 would possess if it were in turn called upon to withstand the weight of the sodium. Under normal operating conditions, the leak-jacket 2 is not in fact subjected to the same conditions of mechanical resistance and leak-tightness as those which would exist if the primary vessel 1 no longer performed its function.

The present invention is precisely directed to a method for testing the leak-jacket and to a reactor which overcome the disadvantage mentioned in the foregoing by permitting continuous testing of the leak-jacket under the conditions to which it would be subjected if it had to withstand the weight of the sodium.

The method for continuous testing of the leak-jacket of a sodium-cooled fast reactor of the type comprising a first enclosure or primary vessel which contains the reactor core and the sodium and above which is located an inert gaz blanket, a second enclosure or leak-jacket which surrounds the first enclosure, both enclosures being placed within a safety enclosure or reactor vault which is closed at the top by a shield slab, is characterized in that the space formed between the two first enclosures is filled with a neutral gas maintained at a pressure substantailly equal to atmospheric pressure, that a vacuum is maintained within the space formed between the second enclosure and the safety enclosure, and that leak-tightness and mechanical resistance of said second enclosure are continuously tested.

It is therefore readily apparent that the conditions which are thus created and to which the leak-jacket is subjected are substantially the same as those which would prevail if said leak jacket were directly subjected to the sodium.

The invention further relates to a sodium-cooled fast reactor for the application of the method, characterized in that it comprises means for feeding neutral gaz into the space limited by the first two enclosures and for maintaining the pressure which prevails therein at a value in the vicinity of atmospheric pressure, means for maintaining a vacuum between the second enclosure and the safety enclosure, means for detecting the presence of neutral gas between said enclosures as a result of possible leakage within the second enclosure, testing of leak-tightness being in that case de facto a test of mechanical resistance of said second enclosure.

In a preferred embodiment, the reactor comprises at least one duct which opens at one end into the top portion of the first enclosure and at the other end into the space limited by the second enclosure and the safety enclosure; said duct or ducts are fitted with bursting discs.

The invention will in any case be more readily understood by perusing the following description of one embodiment of the invention which is given by way of example but not in any sense by way of limitation, reference being made to the single accompanying FIGURE which as already been described.

As mentioned in the foregoing, the method consists in maintaining a vacuum between the enclosures 5 and 2 by any known means such as pumps. In order to resist with the external pressure, the safety enclosure is constituted by a concrete vault 5 of substantial thickness which is in any case necessary to ensure protection of personnel against radiations emitted by the reactor. By way of example, the interior of said concrete vault may be fitted with liner 10 which is anchored to the concrete and equipped with cooling circuits 9. The concrete vault 5 forms a single-unit structural assembly with the concrete vault roof 6 and is slightly prestressed by cables in such a manner as to ensure that the external atphospheric pressure is not liable to be transferred through cracks and to apply a load to the back of the liner between its anchorages in the concrete. The top shield slab or vault roof 6 is also of prestressed concrete, homogeneous calculation of the prestress applied to the assembly 5 and 6 being made with a view to ensuring resistance to an accidental internal pressure. If the primary vessel 1 and the leak-jacket 2 are suspended directly from the vault roof as shown in the FIGURE, they are suspended in a wholly independent manner. The vacuum applied within the space 11 located outside the leak-jacket 2 exerts on this latter a tensile stress which corresponds to a load of approximately 12 m of hot sodium. The mechanical resistance of said jacket and in particular the resistance of its anchorage in the vault roof 6 is therefore continuously checked under conditions of stress and temperature in the vicinity of those to which the jacket would be subjected in the event of damage to the primary vessel 1. The vacuum created within the space 11 does not need to be of a high order.

Possible detection of neutral gas within the space 11 would indicate defective leak-tightness of the jacket 2.

Possible detection of air within the space 11 would indicate defective leak-tightness of the vault roof 6 and of its equipment.

Possible detection of water within the space 11 would indicate defective leak-tightness of the cooling circuits 9 or 9'.

The heat-insulating lining which is sometimes introduced between the leak-jacket and the safety enclosure 5 may be dispensed with since the vacuum within the space 11 performs the same function. Suppression of the insulation facilitates optical inspection of the vessels. It is also desirable to ensure that such heat insulation is "withdrawable" in the event of non-availability of the heat-removal circuits in order that the final emergency circuit may be permitted to remove the macimum amount of heat. In older types of reactor, this relative withdrawal was obtained by choosing a heat-insulating material which was relatively efficient at about 400° C corresponding to normal operating conditions but which again became permeable between 600° and 700° C by reason of radiative heat transfer. Heat-insulation in accordance with the invention by creation of a vacuum is in this case really withdrawable at will in an extremely simple and reliable manner by re-introduction of a gas into the space 11, this being possible at all temperature levels.

During normal operation, the vacuum created within the space 11 makes it possible to reduce to a substantial extent the heat which is completely lost on transfer through said space and consequently permits a very slight increase in the net electrical output of the reactor plant. The assembly constituted by the concrete vault 5 and vault roof 6 is capable of withstanding an accidental excess internal pressure whilst the existence of a vacuum zone reduces this pressure. For example, it is possible to establish a communication between the sky 4 containing the blanket gas of the main vessel 1 and the space 11. To this end, there are formed in the vault roof 6 one or a number of ducts 12 so arranged as to open at one end into the inner top portion of the primary vessel 1 whilst the other end communicates with the evacuated space 11. The duct 12 is fitted at each end with a bursting disc 13 and 13'. Bursting of the discs 13 and 13' takes place in the event of excess pressure within the primary vessel 1 and this clearly has the effect of reducing the pressure within the primary vessel.

Furthermore, when the reactor is filled with sodium ofr the first time, a vacuum may be created successively within the space located outside the leak jacket, the space located outside the primary vessel, then within the interior of said primary vessel. The production of a vacuum within the interior will make it possible to dry this space more rapidly and effectively prior to filling with sodium.

The concrete vault 5 together with its leak-tight liner 10 can form a third and highly effective barrier against any loss of sodium level. This accordingly avoids the need for any vault penetration located below the free level of sodium. Access openings are located solely within the vault roof 6 and the neutron detectors are located within wells which also have their openings in the vault roof.

In addition, a concrete vault structure with creation of a vacuum makes it impossible to cause malicious destruction of the reactor in the most vulnerable parts located beneath the reactor core.

What we claim is:

1. A method for continuous testing of the leak-jacket of a sodium-cooled fast reactor of the type comprising a first enclosure or primary vessel which contains the reactor core and the sodium and above which is located an inert gas blanket, and a second enclosure or leak-jacket which surrounds said first enclosure, both enclosures being placed within a safety enclosure which is closed at the top by a shield slab, the steps of filling the space between the two first enclosures with an inert gas, maintaining the inert gas at a pressure substantially equal to atmospheric pressure, the second enclosure being under the same conditions of restraint as the first enclosure, maintaining a vacuum within the space between said second enclosure and said safety enclosure, and continuously testing the leak-tightness and mechanical resistance of said enclosure by detecting any loss of vacuum within the space between said second enclosure and said safety enclosure by leaking of the inert gas into said space.

2. A sodium-cooled fast reactor having a first enclosure or primary vessel containing the reactor core and the sodium, an inert gas blanket above the core and sodium, a leak-jacket surrounding said first enclosure, a safety enclosure surrounding both the primary vessel and the leak jacket, means for feeding inert gas into the space limited by the first two enclosures, means for maintaining the pressure which prevails therein at a value in the vicinity of atmospheric pressure, the second enclosure being under the same conditions of restraint as the first enclosure, means for maintaining a vacuum between the second enclosure and the safety enclosure, and means for detecting the presence of inert gas between said leak-jacket and said safety enclosure as a result of possible leakage from said second enclosure and for testing of the mechanical resistance of said second enclosure.

3. A reactor according to claim 2, said reactor including at least one duct which opens at one end into the top portion of the first enclosure and at the other end into the space limited by the second enclosure and the safety enclosure, and bursting discs in said ducts.

4. A reactor according to claim 3, including a reactor vault roof, means for suspending the first two enclosures in leak-tight manner from the reactor vault roof and forming said ducts within said roof.

* * * * *